Figure 1:
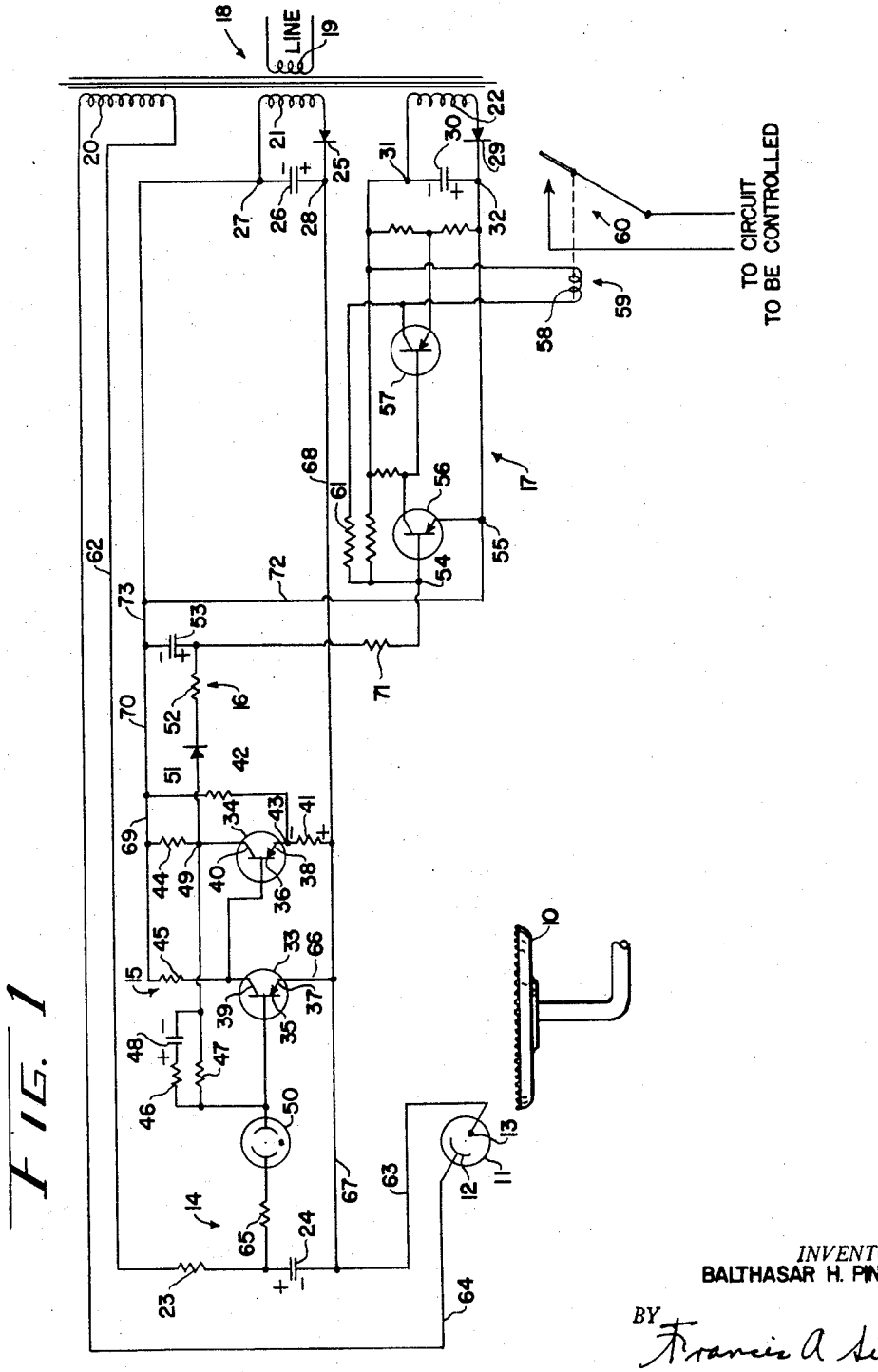

March 24, 1959 B. H. PINCKAERS 2,879,456
CONDITION RESPONSIVE APPARATUS
Filed Jan. 22, 1957 2 Sheets-Sheet 1

INVENTOR.
BALTHASAR H. PINCKAERS
BY
ATTORNEY

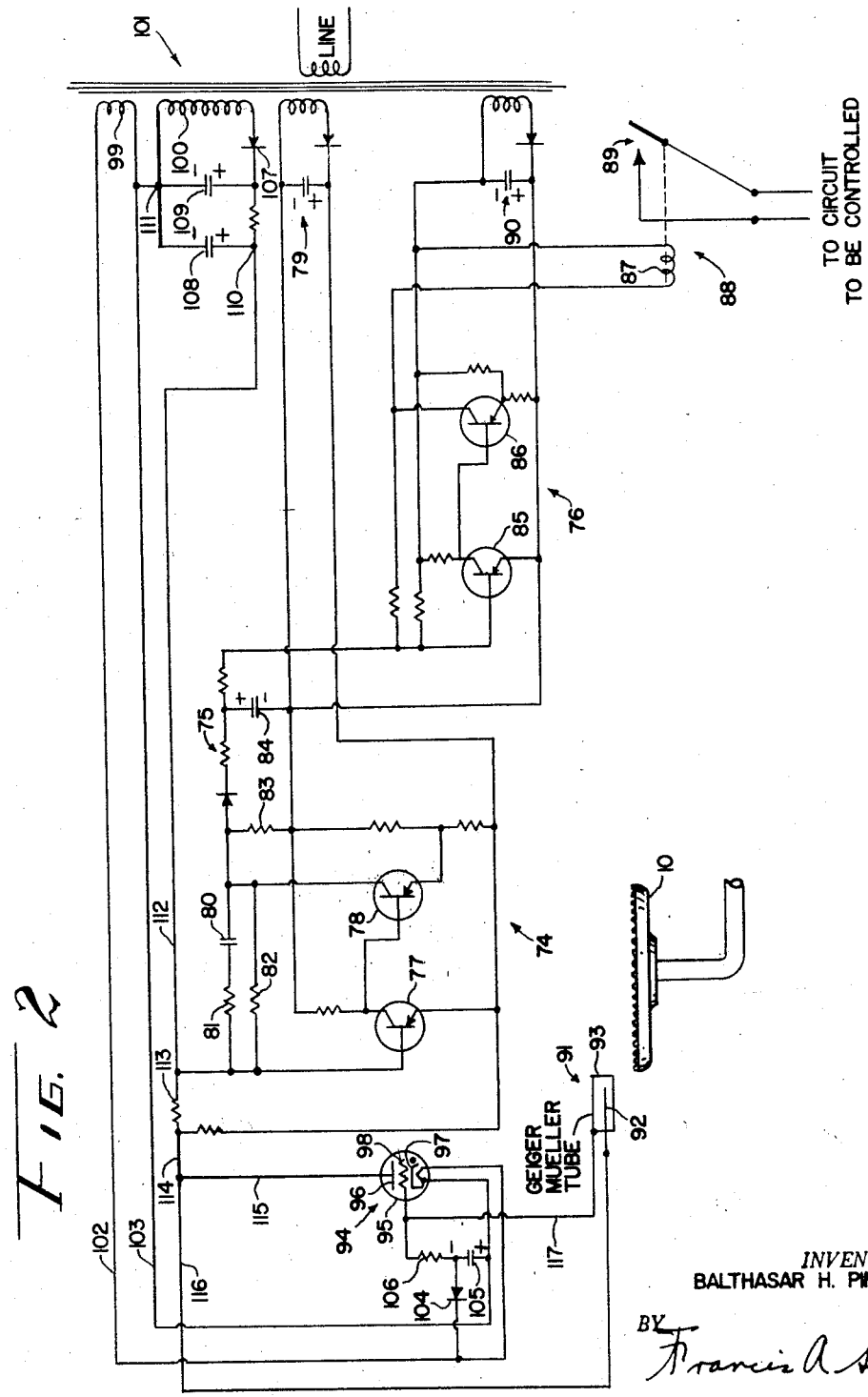

United States Patent Office 2,879,456
Patented Mar. 24, 1959

2,879,456

CONDITION RESPONSIVE APPARATUS

Balthasar H. Pinckaers, Hopkins, Minn., assignor to Minneapolis-Honeywell Regulator Company, Minneapolis, Minn., a corporation of Delaware Application January 22, 1957, Serial No. 635,247

8 Claims. (Cl. 317—148.5)

The present invention is concerned with an improved condition responsive apparatus and more particularly with a condition responsive apparatus employing transistor type electronic networks.

As is well known, a transistor is an electrical current responsive device. The present invention utilizes this principle in a novel condition responsive apparatus wherein upon a condition sensing means being subjected to a given condition, reoccurring pulses of electrical current of relatively short time duration are applied to the input of a transistor type pulse stretching circuit. This pulse stretching circuit then has an output consisting of reoccurring pulses of electrical current of relatively long time duration, the time duration of the pulse stretching circuit being of sufficient length to be integrated to control further means.

By way of example, the present invention is shown associated with a furnace fuel burner wherein a photo emissive cell and a Geiger-Mueller tube may be utilized, as modifications, to sense the presence or absence of flame at the fuel burner. Both the photoemissive photocell and the Geiger tube are devices which inherently provide a relatively minute current flow in response to the presence of flame. In the case of the photoemissive cell, this minute current flow is stored in a capacitor which forms a portion of a relaxation oscillator. This capacitor is then periodically discharged through the input and common electrodes of an electronic valve, this discharge being a pulse of electrical current of relatively high magnitude but short time duration. This pulse is then stretched and applied to an integrating circuit, the integrating circuit having a voltage thereon above a predetermined minimum magnitude so long as the photo emissive cell is continuously subjected to a flame.

In the case of the Geiger tube, a nonself-quenching Geiger tube is utilized and by means of a thyratron quenching circuit, a pulse of electrical current is provided for each discharge of the Geiger tube. This pulse of electrical current functions both to quench the Geiger tube and to trigger a pulse stretching circuit, the output of the pulse stretching circuit again being applied to integrating means, with the voltage of the integrating means being above a predetermined minimum magnitude so long as the Geiger tube is subjected to a flame.

It is therefore an object of the present invention to provide an improved pulse stretching circuit consisting of a monostable network including electronic valves, which network may be utilized in a novel manner to provide an improved condition responsive apparatus when means including condition sensing means are connected to the input of the pulse stretching circuit.

Other objects of the present invention will be apparent to those skilled in the art upon reference to the following specification, claims, and drawings, of which—

Figure 1 is a schematic representation of a first modification of the present invention utilizing a photo emissive cell as the condition sensing means, and Figure 2 is a schematic representation of a second modification of the present invention utilizing a Geiger-Mueller tube as the condition sensing means.

Referring specifically to Figure 1, the reference numeral 10 designates the fuel burner of a furnace. This fuel burner may be controlled in a variety of manners and the exact manner in which fuel is supplied to the burner and in which this fuel is ignited is not shown and forms no part of the present invention. The reference numeral 11 designates a photo emissive cell having a photo sensitive cathode 12 and an anode 13. Photocell 11 is positioned with respect to the fuel burner 10 such that with a flame present at the fuel burner 10, electrons are emitted from the cathode 12 and travel to the anode 13, upon a positive voltage being applied to the anode 13.

Photocell 11 is connected to and forms a part of the improved condition responsive apparatus. This responsive apparatus can be considered to include four portions. The first portion is a relaxation oscillator designated generally by the reference numeral 14. The second portion is a first monostable electronic network which functions as a pulse stretcher and is designated generally by the reference numeral 15. The third portion is an integrating network designated generally by the reference numeral 16, and the fourth portion is a second monostable electronic network designated generally by the reference numeral 17.

Electrical energy for operation of the device of Figure 1 is derived from a transformer 18 having a primary winding 19, connected to a source of alternating voltage, not shown, and having secondary windings 20, 21 and 22. The transformer secondary winding 20 is connected through a resistor 23 and a capacitor 24 to the electrodes of photocell 11 and thereby supplies the operating voltage therefor. The transformer secondary winding 21 is connected to a rectifying diode 25 and a capacitor 26 to form a source of direct current voltage having a negative terminal 27 and a positive terminal 28. The transformer secondary winding 22 is likewise connected to a rectifying diode 29 and a capacitor 30 to form a direct current voltage source having a negative terminal 31 and a positive terminal 32.

Referring now to the first monostable electronic network of Figure 1, designated by the reference numeral 15, this network includes a first transistor 33 and a second transistor 34. The transistors 33 and 34 include base electrodes 35 and 36, emitter electrodes 37 and 38, and collector electrodes 39 and 40. This network 15 has a first stable condition wherein the transistor 39 is in its conducting state and the transistor 34 is cut off. The network is capable of being triggered to a second unstable condition wherein the transistor 33 is now cut off and the transistor 34 is in its conducting state.

The resistors 41 and 42 constitute a voltage dividing means connected across the negative terminal 27 and the positive terminal 28 of the power supply. The emitter electrode 38 of transistor 34 is connected to the intermediate point 43 of the voltage divider. The collector electrode 40 of this transistor is connected through a load resistor 44 to the negative terminal 27 of the power supply. The emitter electrode 37 of transistor 33 is directly connected to the positive terminal 28 of the power supply while the collector electrode 39 of this transistor is connected through a load resistor 45 to the negative terminal 27 of the power supply. The base electrode 36 of transistor 34 is directly connected to the collector electrode 39 of transistor 33. The monostable network is completed by an R-C network including resistors 46 and 47 and capacitor 48 connected from the base electrode 35 of transistor 43 to the collector electrode 40 of transistor 34.

Considering the network 15 in its first or stable condition, the voltage developed across resistor 41 is of the polarity indicated on Figure 1. A further current path exists from the positive terminal 28 through conductors 68 and 66, emitter electrode 37 and base electrode 35, resistor 47, terminal 49, resistor 44, and conductors 69, 70 and 73 to the negative terminal 27. The magnitude of the current flowing in this circuit depends first on the state of charge of capacitor 48 and second on the voltage drop across resistor 44. This last named voltage drop is controlled primarily by the state of conduction of transistor 34. In other words, when transistor 34 conducts current from its emitter to its collector, substantially all of the voltage of source 27—28 appears across the resistor 44. Actually there is a voltage drop across resistor 41 and a further drop across the emitter and collector of transistor 34, with the sum of these three voltages equalling the source voltage.

First assume that capacitor 48 is uncharged, as it would be initially. When voltage is applied to the transformer primary winding 19, either transistor 33 or transistor 34 is initially rendered conductive. In the event that transistor 33 is rendered conductive, the voltage drop across resistor 45 due to the emitter to collector current of transistor 33 is substantially equal to the source 27—28 and in practice, resistor 45 is so selected that the voltage drop from the emitter to the collector of transistor 33 is less than the voltage drop across resistor 41. Since the base electrode of transistor 34 is connected to the collector of transistor 33, the transistor 34 is biased to cutoff because its base 36 is then positive with respect to emitter 38.

However, in the event that transistor 34 is first rendered conductive, the above-mentioned voltage across resistor 41 plus the small voltage drop from the emitter to the collector of transistor 34 is of sufficient magnitude to cause an emitter to base current to flow through transistor 33 and resistor 47 to terminal 49. The magnitude of the current flow is sufficient to render transistor 33 conductive, and, as above described, transistor 34 is then biased to cutoff, thereby reducing the voltage drop across resistor 44 and increasing the emitter to base current of transistor 33.

In either event, transistor 33 is rendered conductive and transistor 34 nonconductive. The emitter to base current flow of transistor 33 charges capacitor 48 as shown and as capacitor 48 charges to substantially the voltage magnitude of the source 27—28, the emitter to base current of transistor 33 reduces. However, sufficient current continues to flow in the circuit to keep transistor 33 conductive and thereby maintain transistor 34 nonconductive. This is the stable state of network 15.

The monostable network 15 remains in this first condition wherein transistor 33 is conductive and transistor 34 is biased to cutoff until a pulse of reverse current is applied flowing from the base 35 to the emitter 37 of transistor 33. This reverse current effectively reduces the magnitude of the forward current flowing from the emitter to the base of this transistor and upon the magnitude of the reverse current becoming sufficiently high, transistor 33 is cut off. With transistor 33 cut off, there is no voltage drop across resistor 45 and the base 36 of transistor 34 is effectively connected to the negative terminal 27 of the power supply, thereby rendering transistor 34 conductive.

Upon transistor 34 being rendered conductive, a fairly high voltage is developed across resistor 44, substantially equal to the supply 27—28. Actually, the sum of the voltage drop across resistor 44, the emitter to collector voltage of transistor 34, and the voltage drop across resistor 41 equals the voltage of supply 27—28, the latter two voltages being of relatively low value.

As has been pointed out, the pulse of current derived from relaxation oscillator 14 is of a short time duration. However, the monostable network is maintained in its unstable condition for a relatively long time period due to the R-C network 46, 47 and 48. This can be explained as follows: the capacitor 48 is charged as shown and to a voltage nearly equal to the voltage of source 27—28 and upon transistor 33 being rendered nonconductive, the capacitor 48 starts to discharge. A voltage now appears across resistor 47 which is due to discharge of capacitor 48 and is of a polarity such that the right-hand end of resistor 47 is negative. Therefore this voltage across resistor 47 is in opposition to the voltage present from terminal 49 to the lower terminal of resistor 41 and is also of a larger magnitude. Therefore a positive voltage is placed on the base electrode of transistor 33 and a negative voltage is placed on the emitter thereof, maintaining the transistor 33 in the nonconductive state. Therefore, the R-C network including capacitor 48, functioning in the above-described manner, maintains the monostable network 15 in its second unstable condition for a given length of time which is relatively long with respect to the short pulse of electrical energy necessary to trip the network 15 from its first stable condition to its second unstable condition.

This above-described short pulse of electrical energy, that is the reverse current flowing from the base 35 to the emitter 37 of transistor 35, is supplied by the relaxation oscillator designated generally by the reference numeral 14. This relaxation oscillator includes capacitor 24 and a gas tube 50. As will be described, upon photocell 11 viewing a flame, capacitor 24 is charged to the polarity indicated in Figure 1. When this charge has built up to a given magnitude, the gas tube 50 fires and a relatively short pulse of electrical current flows from the base 35 to the emitter 37, thereby cutting off transistor 33 and causing the network 15 to go to its second unstable condition. As above described, network 15 is maintained in this second condition for a time duration determined by the R-C network including capacitor 48 and resistors 46 and 47.

So long as the network 15 is in its second unstable condition an emitter to collector current flows in transistor 34 and the pulse of current is developed across load resistor 44.

Integrating means 16 is connected across resistor 44. This integrating means includes a rectifying diode 51, a resistor 52, and an integrating capacitor 53. It can be seen that the elements 51, 52 and 53 are connected in a series circuit across the load resistor 44 and so long as a current flows from the emitter to collector of transistor 34 a voltage is developed across resistor 44 which is of a polarity to cause a current to flow through diode 51 to charge capacitor 53.

Capacitor 53 is connected to the input terminals 54 and 55 of a second monostable electronic network 17. This network 17 includes first and second transistors 56 and 57 which are connected in circuit with the negative terminal 31 and the positive terminal 32 of a direct current voltage source. The electrical circuit components and the operation thereof is substantially identical in network 17 to that described in connection with network 15, and therefore a detailed explanation will not be repeated. It suffices to say that the monostable network 17 has a first stable condition wherein the transistor 56 is conductive and the transistor 57 is nonconductive. Upon a sufficient positive voltage being applied to terminal 54, transistor 56 is biased to cutoff and transistor 57 becomes conductive, this being the second or unstable condition of network 17. In the network 17 the load impedance of the collector electrode of transistor 57 consists of a winding 58 of a relay 59 having switch means 60. Also, the feedback network from the collector electrode of transistor 57 to the base electrode of transistor 56 consists of a resistor 61, such that network 17 does not include the pulse stretching feature of network 15.

The apparatus of Figure 1 is shown in its standby condition. That is, a flame is not present at the burner unit 10, the monostable electronic network 15 is in its first or stable condition, there is little or no voltage present across capacitor 53 in the integrating network 16, and the second monostable electronic network 17 is in its first or stable condition, thereby causing the winding 58 of relay 59 to be de-energized.

Assume now that a flame is established at the burner unit 10, by means not shown. The electromagnetic wave energy generated by the flame strikes the cathode 12 of photocell 11 and causes electrons to be liberated therefrom. Since the electrodes 12 and 13 of photocell 11 are connected to an alternating source of voltage at transformer secondary winding 20, every other half cycle of this source of voltage a current will flow from the anode 13 to the cathode 12. This current flow will take place during that half cycle in which the lower terminal of secondary winding 20 is positive. This current flow circuit can be traced from the lower terminal of transformer secondary winding 20 through conductor 62, resistor 23, capacitor 24, conductor 63, photocell 11, and conductor 64 to the upper terminal of secondary winding 20. This current flow is stored in capacitor 24 and after a given member of half cycles of alternating voltage source, the voltage on capacitor 24 builds up to a value within the firing voltage of gas tube 50. This causes gas tube 50 to ionize and capacitor 24 is rapidly discharged. The discharging current flow circuit for capacitor 24 can be traced from the upper plate of capacitor 24 through resistor 65, gas tube 50, base electrode 35 and emitter electrode 37 of transistor 33, and conductors 66 and 67 to the lower plate of capacitor 24.

As above described, this pulse of reverse current flowing from the base to the emitter of transistor 33 is of sufficient magnitude to cause the transistor 33 to be biased to cutoff. It will be recognized that the time duration of the discharge current pulse of capacitor 24 is controlled by resistor 65 and in practice is relatively short since the energy stored in this capacitor is quickly dissipated through the above-traced circuit. However, once the monostable electronic network 15 is triggered to its second or unstable condition, the electrical energy stored in capacitor 48, which is dissipated through resistors 46 and 47 over a given time period, is effective to maintain the transistor 33 in its cutoff condition for a relatively long period of time. Also as above explained, with transistor 33 in its cutoff condition, substantially no voltage is developed across load resistor 45 and therefore the base electrode 36 of transistor 34 is effectively connected to the negative terminal 37 of the power supply. This causes the transistor 34 to become conductive and a current flows from the emitter to the collector. This current flow circuit can be traced from the positive power supply through conductor 68, resistor 41, emitter 38 and collector 40 of transistor 34, terminal 49, resistor 44 and conductors 69, 70 and 73 to the negative terminal 27 of the power supply.

Upon transistor 34 becoming conductive, a voltage appears across load resistor 44 and therefore the potential level of terminal 49 is increased. In other words, the base electrode 35 of transistor 33 is now connected, through the R-C network, to a terminal 49 which is less negative than it was when the transistor 34 was in its nonconducting state. Therefore, there is less tendency for transistor 33 to be rendered conductive upon the capacitor 24 being discharged and the gas tube 50 of the relaxation oscillator 14 becoming extinguished. Furthermore, the transistor 33 is held in the nonconducting state by the charge stored on capacitor 48. This charge is dissipated over a time period through the resistors 46 and 47 and during that time period, a voltage appears across the load resistor 44 of transistor 34.

So long as the voltage appears across load resistor 44, a charging current flows to capacitor 53 of the integrating network 16. This charging circuit can be traced from the lower terminal of resistor 44 through diode 51, resistor 52, capacitor 53, and conductors 70 and 69 to the upper terminal of resistor 44.

So long as the photoelectric cell 11 is continuously subjected to a flame at the burner unit 10, the capacitor 24 is periodically charged and then discharged through the gas tube 50 to thereby cause the monostable electronic network 15 to cycle between its first stable condition and its second unstable condition. The electronic network 15 functions as a pulse stretching circuit since while the input pulses received from capacitor 24 are of relatively short time duration, the voltage pulses produced across resistor 44 are of relatively long time duration due to the time delay produced by the R-C network including capacitor 48 and resistors 46 and 47.

As above described, during the time periods in which a voltage appears across the load resistor 44, a charging current flows to charge capacitor 53. This current is a pulsating current and the charge on capacitor 53 gradually increases. A discharge current path for capacitor 53 can be traced from the lower plate of the capacitor through resistor 71, terminal 54, the base and emitter electrode of transistor 56, terminal 55, and conductors 72 and 73 to the upper plate of capacitor 53.

This discharge current is in fact a reverse biasing current for transistor 56. It will be remembered that the second monostable network 17 is in its first or stable condition wherein transistor 56 is conducting and transistor 57 is cut off. In this condition, the base to emitter impedance of transistor 56 is relatively low and therefore for all practical purposes the only impedance in this above-traced circuit is the impedance supplied by resistor 71. However, so long as capacitor 53 continues to receive pulses of electrical current at a sufficiently high frequency, determined by the charge received by capacitor 24 due to photocell 11 sensing flame, the charge on capacitor 53 builds up over a time period to a given minimum value.

This charge on capacitor 53 determines the magnitude of the reverse biasing current applied to the base electrode of transistor 56 through resistor 71. Upon the magnitude of this current reaching a given value, the transistor 56 is biased to the nonconducting condition and the monostable electronic network 17 is triggered from its stable to its unstable condition. Therefore, transistor 56 becomes nonconductive and transistor 57 becomes conductive. As is well known, as soon as transistor 56 becomes nonconductive its base to emitter impedance is greatly increased. The above-traced discharging circuit for capacitor 53 includes the base to emitter impedance of transistor 56 and therefore once the monostable electronic network 17 has been triggered from its stable to its unstable condition, the discharge rate of capacitor 53 of the integrating network 16 is appreciably reduced. In other words, once the electronic network 17 has been triggered, capacitor 53 discharges at a much slower rate, thereby providing for a certain time delay in the sensing of the subsequent absence of flame at the burner unit 10 thereby giving a certain stability to the apparatus.

Upon electronic network 17 being triggered to its unstable condition, the transistor 57 is rendered conductive and the emitter to collector current of this transistor energizes the winding 58 of relay 59. The switch means 60 of this relay therefore moves from its open condition as shown in Figure 1 to its closed condition, thereby completing a circuit, labeled on Figure 1 as a circuit to be controlled. The switch means 60 of relay 59 can be utilized in a variety of manners either for safety shutdown of a fuel burner unit or to actuate an alarm, and for this reason the general indication of controlling a circuit has been utilized in Figure 1.

The operation of the apparatus of Figure 1 has now been traced from its standby condition to the condition wherein a flame has been established at the fuel burner 10 and has been detected by means of the photocell 11, the relaxation oscillator 14, the first monostable electronic network 15, the integrating network 16, and the second monostable electronic network 17 to energize relay 59. Upon a subsequent absence of flame at the fuel burner 10, the charging circuit for capacitor 24 is no longer effective since the charging circuit is essentially open at the photocell 11 which no longer views a flame. Therefore, the base to emitter current of transistor 33, as produced by the relaxation oscillator 14, no longer exists and the electronic network 15 remains in its first or stable condition and does not cycle between its stable and its unstable condition. After a given time period, for example two to four seconds, the charge on capacitor 53 is dissipated and the electronic network means 17 likewise once again assumes its first or stable condition. In this condition, transistor 57 is cut off and relay 59 is de-energized. The apparatus of Figure 1 is now once again in its standby condition.

Referring now to the modification of Figure 2, this modification likewise utilizes a first monostable electronic network designated generally by the reference numeral 74, an integrating network designated generally by the reference numeral 75, and a second monostable electronic network designated generally by the reference numeral 76. The first monostable electronic network 74 includes two transistors 77 and 78. These transistors receive their operating voltage from a direct current source of voltage designated generally by the reference numeral 79. As with Figure 1, electronic network 74 has a first stable condition wherein transistor 77 is conductive and transistor 78 is nonconductive. Network 74 likewise utilizes an R-C network including capacitor 80 and resistors 81 and 82 which form a feedback network from the collector of transistor 78 to the base of transistor 77.

The operation of the first monostable electronic network 74 of Figure 2 is identical to that of the first monostable electronic network 15 of Figure 1, and therefore a detailed explanation of its operation will not be repeated. It suffices to say that the network 74 of Figure 2 functions as a pulse stretching arrangement and whereas pulses of electrical current of relatively short time duration are applied to the base and emitter electrodes of transistor 77, a pulse of voltage of relatively long time duration appears across load resistor 83 of transistor 78 as a result thereof.

As with Figure 1, the voltage across resistor 83 is integrated by the integrating network 75 to charge capacitor 84.

The charge on capacitor 84 is applied to the base and emitter electrodes of transistor 85 of the second monostable electronic network 76. Network 76 includes a second transistor 86 and as with network 17 of Figure 1, this monostable electronic network 76 has a first stable condition wherein transistor 85 is conductive and transistor 86 is nonconductive. The output of transistor 86 includes the winding 87 of a relay 88 having switch means 89. Electrical operating voltage for the electronic network 76 is supplied by the direct current source of voltage designated generally by the reference numeral 90.

The apparatus of Figure 2 is shown associated with a fuel burner unit 10 and utilizes a Geiger-Mueller tube designated generally by the reference numeral 91 so associated with the burner unit 10 as to detect a flame when present at the burner unit. The Geiger-Mueller tube is of the nonself-quenching type and has a first electrode 92 which is the anode of the device and a second electrode 93 which is the cathode. Since the Geiger tube 91 is of the nonself-quenching type, a means must be provided to quench the discharge of the tube. In other words, upon an ionizing event passing through the tube 91, electrons are emitted from the cathode 93 and pass through the gas fill in the Geiger tube to the anode 92. The discharge in the Geirger tube 91 becomes a gas discharge and is self-sustaining unless means are provided to extinguish the discharge, this being accomplished by appreciably reducing the voltage between the cathode 93 and the anode 92 of the Geiger tube.

This quenching is accomplished by means of a thyratron quenching circuit designated generally by the reference numeral 94. This quenching circuit includes a thyratron 95 having an anode 96, a directly heated cathode 97, and a control or starting electrode 98. Operating voltage for both the Geiger tube 91 and the thyratron 95 is derived from secondary windings 99 and 100 provided by transformer 101. The secondary winding 99 is a relatively low voltage winding and is connected by means of conductors 102 and 103 to energize the filament of thyratron 95. The secondary winding 99 likewise provides a biasing voltage for the control electrode 98 of thyratron 95. This biasing voltage is derived by means of a rectifying diode 104 and a capacitor 105 which are connected in series across the conductors 102 and 103. The capacitor 105 is charged to the polarity indicated in Figure 2 and the lower or positive plate of this capacitor is connected to the directly heated cathode 97 while the upper or negative plate of this capacitor is connected through a resistor 106 to the control electrode 98 of thyratron 95.

The secondary winding 100 is rectified by means of rectifying diode 107 and this rectified voltage charges capacitors 108 and 109 to provide a relatively high direct current voltage between a positive terminal 110 and a negative terminal 111. The positive terminal 110 of this direct current source of voltage is connected by means of conductor 112, load resistor 113, conductors 114 and 115 to the anode 96 of thyratron 95. The cathode of thyratron 95 is connected by means of conductor 103 to the negative terminal 111 of this source of voltage.

The anode and cathode of Geiger tube 91 are connected to the terminals 110 and 111 of the direct current source of voltage by means of a circuit which can be traced from the positive terminal 110 through conductor 112, resistor 113, conductors 114 and 116, anode 92 and cathode 93 of Geiger tube 91, conductor 117, resistor 106, diode 104, conductor 102, and secondary winding 99 to the negative power supply terminal 111.

Considering in detail the operation of Geiger tube 91 and its thyratron quenching circuit 94, it should first be pointed out that in the event a flame is present at the burner unit 10 the Geiger tube 91 is subject to sustained electromagnetic radiation from the flame and a rather regular rate of discharge or firing of the Geiger tube 91 is established. However, even in the event of the absence of flame at the burner unit 10, the Geiger tube 91 inherently is ionized at an unpredictable rate, this being called the background count of the Geiger tube and originating from unpredictable electromagnetic radiation which impinges upon the cathode 93 of the Geiger tube from sources other than a flame at the burner unit 10. In any event, regardless of whether the discharge of the Geiger tube 91 is a background count or actually due to flame at the burner unit 10, upon the Geiger tube 91 being ionized a pulse of electrical current flows from the positive power supply terminal 110 through conductor 112, load resistor 113, conductors 114 and 116, anode 92 and cathode 93 of Geiger tube 91, conductor 117, resistor 106, diode 104, conductor 102, and secondary winding 99 to the negative power supply terminal 111. This pulse of current is in a direction to cause the upper terminal of the resistor 106 to be positive with respect to the lower terminal. Therefore, this voltage developed across resistor 106 tends to overcome the bias voltage present on capacitor 105 and thyratron 95 is triggered to become conductive. Upon thyratron 95 being rendered conductive a circuit can be traced from the positive power supply terminal 110 through conductor 112, load resistor 113, conductors 114 and 115, anode 96 and cathode 97 of thyratron 95, and conductor 103 to the negative terminal 111 of the power supply.

This above-traced circuit produces a pulse of electrical voltage across resistor 113. The polarity of this voltage is such that the right-hand terminal of the resistor is rendered positive with respect to the left-hand terminal. Resistor 113 and the voltage developed thereacross performs two functions. Its first function is rapidly to drop the voltage across the anode and cathode of both the Geiger tube 91 and the thyratron 95 such that both of these gas tubes are extinguished. Therefore, the Geiger tube 91 is once again in a condition to respond to a further electromagnetic radiation impinging upon its cathode 93 and the thyratron 95 is further conditioned to once again respond to the development of a pulse of voltage across resistor 106 to once again extinguish the Geiger tube 91.

The second function of resistor 113 and the voltage thereacross is to provide a pulse of voltage of relatively short time duration to trigger the electronic network 74 from its stable condition to its unstable condition, much in the same manner that the output of the relaxation oscillator 14 of Figure 1 is utilized to trigger the electronic network 15 of Figure 1 from its stable to its unstable condition.

As mentioned, the polarity of the pulse of voltage developed across resistor 113 is such as to place a positive voltage on the base electrode of transistor 77 and a negative voltage on the emitter electrode thereof. The polarity of this voltage is such as to bias the transistor 77 to be nonconductive, thereby triggering the electronic network 74 to its unstable condition wherein the transistor 77 is nonconductive and transistor 78 is conductive.

As described in connection with Figure 1, the network 74 of Figure 2 is maintained in this second unstable condition for a certain time period as determined by the capacitor 80 and resistors 81 and 82. Therefore, electronic network 74 functions as the pulse stretcher and pulse amplifier. A pulse of voltage of relatively long time duration is developed across resistor 83. This voltage is integrated by means of integrating network 75 and the capacitor 84 is charged. In the event that the Geiger tube 91 is in fact subjected to a flame so that sustained cyclic discharge occurs in Geiger tube 91 and therefore sustained pulses of voltage are developed across resistor 113, the capacitor 84 is charged over a given time period to a certain minimum value. As with Figure 1, the capacitor 84 of Figure 2 is connected to the base and emitter electrodes of transistor 85 in a direction to tend to bias this transistor to cutoff. So long as the voltage on capacitor 84 is below a given minimum value, the transistor 85 remains in its conducting condition and the electronic network 76 remains in its stable condition wherein transistor 86 is nonconductive.

However, upon the charge on capacitor 84 building up above the given minimum value, the electronic network 76 is triggered from its stable to its unstable condition wherein transistor 85 is cut off and transistor 86 is rendered conductive to thereby energize relay 88 and cause the relay switch means 89 to move from the open to the closed condition. So long as the capacitor 84 continues to receive pulses of electrical current to maintain a given charge on this capacitor, the electronic network 76 remains in its unstable condition and the relay 88 remains continuously energized, thereby indicating that a flame is present at the burner unit 10.

If the flame should now be extinguished at the burner unit 10, the Geiger tube 91 no longer senses the flame and while a background count of rather irregular nature may cause the Geiger tube to periodically discharge, there is no sustained cyclic discharge of the Geiger tube and the voltage on capacitor 84 therefore reduces appreciably to the point where the electronic network 76 once again assumes its stable condition with transistor 85 conductive and transistor 86 nonconductive to thereby de-energize relay 88.

From the above explanation with regard to the modifications of Figure 1 and Figure 2 it can be seen that I have provided an improved condition responsive apparatus utilizing a condition sensing means which in combination with other electrical and electronic components produces a pulsating electrical signal of relatively short time duration which is applied to a pulse stretching and amplifying network, the output of which controls means in accordance with the presence or absence of the condition to be detected. While the specific modifications discussed show the use of a photo emissive cell and a Geiger-Mueller tube, the invention is not limited to the use of this specific condition sensing means, for example, a flame rod could be utilized in place of the photo emissive cell of Figure 1.

Other modifications of the present invention will be apparent to those skilled in the art and it is intended that the scope of the present invention be limited solely by the scope of the appended claims.

I claim as my invention:

1. Condition detecting apparatus comprising; electrical network means including condition sensing means arranged to be subjected to a given condition, said electrical network means being constructed and arranged to provide reoccurring electrical current pulses of relatively short time duration upon said condition sensing means being subjected to the given condition; a monostable transistor network including a first and second transistor each having a base electrode, an emitter electrode, and a collector electrode, circuit means connecting the emitter electrode of said first transistor directly to a positive voltage terminal, circuit means connecting the collector electrode of said first transistor through a load impedance to a negative voltage terminal, voltage dividing means connected across said positive and negative terminals, circuit means connecting the emitter electrode of said second transistor to an intermediate point on said voltage dividing means, circuit means connecting the collector electrode of said second transistor through a further load impedance to said negative terminal, circuit means connecting the base electrode of said second transistor to the collector electrode of said first transistor, circuit means including an R-C network connecting the collector electrode of said second transistor to the base electrode of said first transistor, said monostable transistor circuit having a stable condition wherein an emitter to collector current flows in said first transistor and the emitter to collector current of said second transistor is substantially cut off, said monostable transistor circuit being triggered to a second condition wherein the emitter to collector current of said first transistor is substantially cut off and the emitter to collector current of said second transistor flows through said further load impedance to develop a voltage thereacross, said monostable transistor circuit being maintained in said second condition for a time period determined by said R-C network; circuit means connecting the emitter and base electrodes of said first transistor to said electrical network to thereby apply said electrical current pulses thereto and thereby cause voltage pulses of relatively long time duration to appear across said further load impedance, and further means including an electromagnetic relay winding connecting to be energized in accordance with the voltage across said further load impedance.

2. In combination, a pulse stretching and pulse amplifying circuit comprising, a first and a second transistor, each having an input electrode, an output electrode and a common electrode, circuit means connecting the input electrodes of said first and second transistors to a source of positive potential, circuit means connecting the output electrode of said first transistor to a source of negative potential, impedance means, circuit means connecting the output electrode of said second transistor through said impedance means to said source of negative potential, circuit means connecting the common electrode of said second transistor to the output electrode of said first transistor, circuit means including an electrical energy storage network connecting the common electrode of said first transistor to the output electrode of said second transistor such that upon a pulse of current of relatively short duration being applied to the common electrode and the input electrode of said first transistor, said first transistor is rendered nonconductive and maintained nonconductive for a time duration determined by said electrical energy storage network.

3. In combination a monostable electronic network having a first and a second electronic valve each having an input electrode, an output electrode, and a common electrode, a source of direct current voltage having a first and a second terminal of opposite polarity, circuit means connecting the input electrode of said first electronic valve directly to said first terminal, circuit means connecting the output electrode of said first electronic valve through a load impedance to said second terminal, a voltage dividing means connected between said first and second terminals, circuit means connecting the input electrode of said second electronic valve to an intermediate point of said voltage dividing means, circuit means connecting the output electrode of said second electronic valve through a further load impedance to said second terminal, circuit means connecting the common electrode of said second electronic valve directly to the output electrode of said first electronic valve, and circuit means including a parallel connected capacitor and resistor connected from the output electrode of said second electronic valve to the common electrode of said first electronic valve, said network having a first stable condition wherein an output current flows in the output electrode circuit of said first electronic valve and wherein the output electrode current of said second electronic valve is substantially cut off, the common electrode and input electrode of said first electronic valve constituting input means such that a pulse of electrical energy applied thereto causes said monostable unit to assume a second unstable condition wherein the output electrode current of said first electronic valve is substantially cut off and the output electrode current of said second electronic valve flows through said further load impedance to develop a voltage thereacross, said monostable unit to be maintained in said second unstable condition for a time period determined by said parallel connected capacitor and resistor.

4. Condition responsive apparatus comprising; electrical network means including condition sensing means arranged to be subjected to a given condition, said electrical network means being constructed and arranged to provide reoccurring pulses of electrical energy of relatively short time duration in response to said condition sensing means being subjected to the given condition; a first monostable electronic network having a first stable condition and a second unstable condition to which said electronic network is triggered upon a pulse of electrical energy being applied to the input of said electronic network, said first monostable electronic network including electrical energy storage means to provide a relatively long time duration of operation in said second unstable condition to thereby cause said first monostable electronic network to effectively act as a pulse stretcher when a pulse of electrical energy of relatively short time duration is supplied to the input thereof; integrating means connected to the output of said first monostable electronic network to thereby integrate the output electrical energy thereof; means connecting the input of said first monostable electronic network to said electrical network means to thereby cause a voltage above a predetermined minimum magnitude to appear on said integrating means upon said condition sensing means being subjected to the given condition; a second monostable electronic network having a first stable condition and a second unstable condition to which said second monostable electronic network is triggered upon a voltage above said predetermined minimum magnitude being applied thereto, output means controlled by said second monostable electronic network and energized when said second monostable electronic network is in said second unstable condition; and means connecting the input of said second monostable electronic network to said integrating means to thereby energize said output means upon said condition sensing means being subjected to the given condition.

5. Condition responsive apparatus comprising; unidirectional current conducting condition responsive means arranged to be subjected to a given condition and to be rendered unidirectionally conductive upon being subjected to the given condition, a source of alternating voltage, a first capacitor, means connecting said first capacitor and condition sensing means in series to said source of alternating voltage to thereby cause said capacitor to be charged upon said condition sensing means being subjected to the given condition, a first and a second transistor each having a base, an emitter and a collector electrode, a source of direct current voltage having a positive terminal and a negative terminal, circuit means connecting the emitter electrodes of said first and second transistors to said positive terminal, first and second resistors, circuit means connecting the collector electrodes of said first and second transistors through said first and second resistors respectively to said negative terminal, circuit means connecting the base electrode of said second transistor to the collector electrode of said first transistor, impedance means including a second capacitor, circuit means connecting said impedance means between the base electrode of said first transistor and the collector electrode of said second transistor such that an emitter to base charging current for said second capacitor flows in said second transistor, a relaxation oscillator including said first capacitor, means connecting said relaxation oscillator to the base and collector electrodes of said first transistor to thereby cause said first capacitor to periodically discharge a pulse of current of short duration through the emitter to base circuit of said first transistor in a manner to cut off said first transistor and thereby render said second transistor conductive, said second capacitor thereby discharging to maintain said first transistor nonconductive for a time duration longer than the duration of the discharge of said first capacitor to thereby produce a stretched pulse of voltage across said second resistor connected to the collector electrode of said second transistor, integrating means including a third capacitor connected to integrate the current across said second resistor, said third capacitor thereby having a voltage thereon which is of a magnitude above a predetermined minimum so long as the frequency of discharge of said first capacitor is above a predetermined minimum, and further means connected to said third capacitor and responsive only to a voltage of a magnitude above said minimum value.

6. Condition responsive apparatus comprising; electrical network means including in circuit connection a source of voltage, a capacitor, and condition sensing means capable of conducting a low magnitude electrical current when subjected to a given condition to thereby charge said capacitor; a monostable network having an input and an output and having a first stable condition and a second condition to which said network is triggered by an electrical signal applied to the input thereof, time delay means included in said monostable network to maintain said network in said second condition for a relatively long time period; voltage responsive current conducting means capable of conducting electrical current when a voltage above a given magnitude is applied thereto; circuit means including said voltage responsive means connecting the input of said monostable network to said capacitor to periodically discharge said capacitor when said capacitor is charged to a voltage above said given magnitude as a result of said condition sensing means being subjected to said given condition, to thereby apply periodic electrical signal pulses of relatively short time duration to said input so long as said condition sensing means is subjected to said given condition, said monostable network thereby being periodically triggered to said second condition to effectively stretch said electrical signal pulses; and further means connected to the output of said monostable network and controlled in accordance with the condition to which said condition sensing means is subjected.

7. Flame detecting apparatus comprising; a Geiger tube arranged to be subjected to a flame, a quenching circuit having an input connected to said Geiger tube to be controlled thereby, means connecting the output of said quenching circuit to said Geiger tube to quench said Geiger tube upon said Geiger tube being subjected to a flame and thereby cause a signal consisting of reoccurring pulses of electrical energy of relatively short duration upon said Geiger tube being subjected to a flame, a pulse stretching circuit having an input and an output, circuit means connecting the input of said pulse stretching circuit to said quenching circuit to apply said signal to the input of said pulse stretching circuit, the output of said pulse stretching circuit thereby consisting of reoccurring pulses of electrical energy of relatively long duration upon said Geiger tube being subjected to a flame, integrating means connected to the output of said pulse stretching circuit to integrate the output thereof, and further means connected to said integrating means to be controlled thereby.

8. Condition responsive apparatus comprising; electrical network means including condition sensing means arranged to be subjected to a given condition, said electrical network means being constructed and arranged to provide reoccurring pulses of electrical energy of relatively short time duration in response to said condition sensing means being subjected to the given condition; a monostable electronic network having a first stable condition and a second unstable condition to which said electronic network is triggered upon a pulse of electrical energy being applied to the input of said electronic network, said monostable electronic network including electrical energy storage means to provide a relatively long time duration of operation in said second unstable condition to thereby cause said monostable electronic network to effectively act as a pulse stretcher when a pulse of electrical energy of relatively short time duration is supplied to the input thereof; integrating means connected to the output of said monostable electronic network to thereby integrate the output electrical energy thereof; means connecting the input of said monostable electronic network to said electrical network means to thereby cause a voltage above a predetermined minimum magnitude to appear on said integrating means upon said condition sensing means being subjected to the given condition; and means connected to be controlled by said integrating means in accordance with the voltage thereon.

References Cited in the file of this patent

UNITED STATES PATENTS

| | | |
|---|---|---|
| 2,632,040 | Rabinow | Mar. 17, 1930 |
| 2,730,629 | Atkins | Jan. 10, 1956 |
| 2,742,151 | Milford | Apr. 17, 1956 |